(12) United States Patent
Komiyama et al.

(10) Patent No.: US 8,928,925 B2
(45) Date of Patent: Jan. 6, 2015

(54) MULTIFUNCTION DEVICE AND METHOD FOR PRINTING AND READING DATA ON A MEDIUM

(71) Applicant: Seiko Epson Corporation, Tokyo (JP)

(72) Inventors: Takahisa Komiyama, Takashina-machi (JP); Kazuya Toshima, Ueda (JP)

(73) Assignee: Seiko Epson Corporation, Tokyo (JP)

( * ) Notice: Subject to any disclaimer, the term of this patent is extended or adjusted under 35 U.S.C. 154(b) by 177 days.

(21) Appl. No.: 13/628,457

(22) Filed: Sep. 27, 2012

(65) Prior Publication Data

US 2013/0077121 A1 Mar. 28, 2013

(30) Foreign Application Priority Data

Sep. 28, 2011 (JP) ................................ 2011-213327

(51) Int. Cl.
| | | |
|---|---|---|
| G06F 3/12 | (2006.01) | |
| G06K 15/00 | (2006.01) | |
| B41J 2/01 | (2006.01) | |
| B41J 29/38 | (2006.01) | |
| G07F 17/42 | (2006.01) | |
| G07G 5/00 | (2006.01) | |
| H04N 1/32 | (2006.01) | |
| G07F 19/00 | (2006.01) | |

(52) U.S. Cl.
CPC ............... *B41J 2/01* (2013.01); *H04N 1/32491* (2013.01); *G07F 19/202* (2013.01); *H04N 1/32486* (2013.01); *B41J 29/38* (2013.01); *G07F 17/42* (2013.01); *G07G 5/00* (2013.01)
USPC .......................................... 358/1.16; 358/1.13

(58) Field of Classification Search
CPC ............. B41J 29/38; B41J 2/01; G07F 17/42; G07F 19/202; G07G 5/00; H04N 1/32486; H04N 1/32491

USPC .................................... 358/1.13, 1.16; 705/43
See application file for complete search history.

(56) References Cited

U.S. PATENT DOCUMENTS

| | | | |
|---|---|---|---|
| 2003/0076533 | A1 | 4/2003 | Izumi |
| 2005/0105124 | A1* | 5/2005 | Ogasawara ................... 358/1.15 |
| 2006/0198683 | A1 | 9/2006 | Sasaki et al. |
| 2008/0144100 | A1 | 6/2008 | Tomii et al. |
| 2009/0236412 | A1* | 9/2009 | Amorim ........................ 235/379 |
| 2010/0327509 | A1* | 12/2010 | McGarry ......................... 270/18 |

FOREIGN PATENT DOCUMENTS

| | | | |
|---|---|---|---|
| CN | 1414762 A | | 4/2003 |
| JP | 2002-255393 A | | 9/2002 |
| JP | 2008-023736 A | | 2/2008 |
| JP | 2008-152401 A | | 7/2008 |

\* cited by examiner

*Primary Examiner* — Fred Guillermety
(74) *Attorney, Agent, or Firm* — Nutter McClennen & Fish LLP; John J. Penny, Jr.; Joshua I. Rudawitz

(57) ABSTRACT

A multifunction device that has functions for reading media and printing tickets, and produces tickets on which an image reflecting the result of reading the medium is recorded under the control of a control device, can quickly reprint a ticket when a command to reprint the ticket is received. When image data is written to a first buffer 77a, the ticket production control unit 70a of the multifunction device 1 copies the image data to a second buffer 77b. When a command to reprint the ticket is received, the ticket production control unit 70a causes a thermal printer unit 60 to record an image on thermal roll paper based on the image data copied to the second buffer 77b, and then cuts the thermal roll paper to reproduce the ticket.

8 Claims, 6 Drawing Sheets

MULTIFUNCTION DEVICE AND METHOD FOR PRINTING AND READING DATA ON A MEDIUM

Priority is claimed under 35 U.S.C. §119 to Japanese Application nos. 2011-213327 filed on September 28, which is hereby incorporated by reference in their entirety.

BACKGROUND

1. Technical Field

The present invention relates to a multifunction device that can connect to a control device, process media, and produce tickets, a method of controlling the multifunction device, and a storage medium storing a program for achieving the method of controlling the multifunction device.

2. Related Art

Media processing devices that convey media such as checks, and magnetically and optically read the media while the media are being conveyed, are known from the literature. See, for example, Japanese Unexamined Patent Appl. Pub. JP-A-2002-255393.

Media processing devices of this type are generally connected to a host computer or other control device. The results of reading the media are output to the control device and desirably processed by the control device.

Tickets printed with information related to reading the medium may also be produced as part of the media reading process in such media processing devices, and the printed ticket may be given to the customer or stored as required. One example of such tickets are receipts printed with an image of the processed medium and information showing that reading the medium was completed. After the original ticket is produced, a duplicate ticket containing information of the same content as the original ticket may also be produced in response to a request by the person that received the ticket or some other reason.

Multifunction devices that have a function for reading media and a function for producing tickets, and produce tickets on which an image reflecting the result of reading media is recorded as controlled by the control device, can reprint a ticket when a control command for reprinting a ticket is received from the control device, but may not be able to produce the ticket quickly due to the operating status of the control device or the conditions of communication with the control device. The product value of the multifunction device can therefore be improved if the multifunction device can quickly reprint a ticket when a reprint command is received regardless of the operating status of the control device or the state of communication with the control device.

SUMMARY

With consideration for the foregoing problem, the present invention enables a multifunction device that has a function for reading media and a function for producing tickets, and can produce tickets on which an image reflecting the result of reading media is recorded as controlled by a control device, to quickly reprint a ticket when a command for reprinting a ticket is received.

One aspect of the invention is a multifunction device that can connect to a control device and includes: a conveyance unit that conveys a medium; a reading unit that reads the medium conveyed by the conveyance unit and outputs the read result to the control device; a ticket producing unit that produces a ticket by recording an image on the recording medium and cutting the recording medium; a reception unit that receives from the control device a control command for producing a ticket on which an image reflecting the read result from the reading unit is recorded; and a ticket production control unit that produces a ticket based on the control command received by the reception unit by writing image data to a first buffer, recording an image on the recording medium with the ticket producing unit based on the buffered image data, and cutting the recording medium; wherein the ticket production control unit copies the image data written to the first buffer to a second buffer when the image data is written to the first buffer, and when a command to reprint the ticket is received, reprints the ticket by recording an image on the recording medium with the ticket producing unit based on the image data copied to the second buffer, and cutting the recording medium.

When producing a ticket with this aspect of the invention, the image data written to the first buffer is copied to the second buffer as image data is written to the first buffer, and when a command to reprint the ticket is received, images are recorded on the recording medium based on the image data copied to the second buffer, the recording medium is cut, and the ticket is issued. As a result, there is no need to receive control commands related to reprinting a ticket from the control device in order to reprint the ticket, and tickets can be quickly reproduced without being affected by the state of communication with the control device.

In another aspect of the invention, a cut command for cutting the recording medium is preferably included in the control command; and after the reception unit starts receiving a control command from the control device, the ticket production control unit copies image data written to the first buffer to the second buffer as the image data to be recorded on one ticket until the recording medium is cut based on the cut command, and when a command to reprint the ticket is received, records on the recording medium with the ticket producing unit based on the image data copied to the second buffer as the image data of the image to be recorded on the one ticket.

Knowing that the cut command for cutting the recording medium is the last command in the control command sequence for producing one ticket, image data can be copied to the second buffer ticket by ticket, and when a ticket is reprinted, the images to be recorded can be recorded on the ticket with no loss of information.

In another aspect of the invention, the ticket production control unit specifically processes the image data copied to the second buffer for recording on a reprinted ticket.

By specifically processing the image data copied to the second buffer premised on the image data being recorded when reprinting a ticket, images can be recorded on a reprinted ticket so that the ticket can be recognized as a reprint.

In another aspect of the invention, multifunction device preferably also has one or a plurality of switches for inputting a command; and reprinting the ticket can be commanded by operating the switch in a specific way.

This aspect of the invention can reduce production costs because there is no need to provide a dedicated switch for reprinting, and a reprint command can be asserted using an existing switch.

Another aspect of the invention is a method of controlling a multifunction device that can connect to a control device and has a conveyance unit that conveys a medium, a reading unit that reads the medium conveyed by the conveyance unit and outputs the read result to the control device, and a ticket producing unit that produces a ticket by recording an image on the recording medium and cutting the recording medium, the control method including steps of: receiving from the control device a control command for producing a ticket on which an image reflecting the read result from the reading unit is recorded; producing a ticket based on the control command received by the reception unit by writing image data to a first buffer, recording an image on the recording medium with the ticket producing unit based on the buffered image data, and cutting the recording medium; copying the image data written to the first buffer to a second buffer when the image data is written to the first buffer; and when a command to reprint the ticket is received, reprinting the ticket by recording an image on the recording medium with the ticket producing unit based on the image data copied to the second buffer, and cutting the recording medium.

When producing a ticket with this method, the image data written to the first buffer is copied to the second buffer as image data is written to the first buffer, and when a command to reprint the ticket is received, images are recorded on the recording medium based on the image data copied to the second buffer, the recording medium is cut, and the ticket is issued. As a result, there is no need to receive control commands related to reprinting a ticket from the control device in order to reprint the ticket, and tickets can be quickly reproduced without being affected by the state of communication with the control device.

Another aspect of the invention is a recording medium storing a program that is run by a control unit that controls parts of a multifunction device that can connect to a control device and has a conveyance unit that conveys a medium, a reading unit that reads the medium conveyed by the conveyance unit and outputs the read result to the control device, and a ticket producing unit that produces a ticket by recording an image on the recording medium and cutting the recording medium, the program causing the control unit to execute steps of: producing a ticket based on a control command received from the control device for producing a ticket on which an image reflecting the read result from the reading unit is recorded by writing image data to a first buffer, recording an image on the recording medium with the ticket producing unit based on the buffered image data, and cutting the recording medium; copying the image data written to the first buffer to a second buffer when the image data is written to the first buffer; and when a command to reprint the ticket is received, reprinting the ticket by recording an image on the recording medium with the ticket producing unit based on the image data copied to the second buffer, and cutting the recording medium.

When producing a ticket by executing this program, the image data written to the first buffer is copied to the second buffer as image data is written to the first buffer, and when a command to reprint the ticket is received, images are recorded on the recording medium based on the image data copied to the second buffer, the recording medium is cut, and the ticket is issued. As a result, there is no need to receive control commands related to reprinting a ticket from the control device in order to reprint the ticket, and tickets can be quickly reproduced without being affected by the state of communication with the control device.

EFFECT OF THE INVENTION

A multifunction device that has a function for reading media and a function for producing tickets, and can produce tickets on which an image reflecting the result of reading the processed medium is recorded under the control of a control device, can quickly reprint a ticket when a command for reprinting a ticket is received.

Other objects and attainments together with a fuller understanding of the invention will become apparent and appreciated by referring to the following description and claims taken in conjunction with the accompanying drawings.

DESCRIPTION OF EMBODIMENTS

Figure 1:
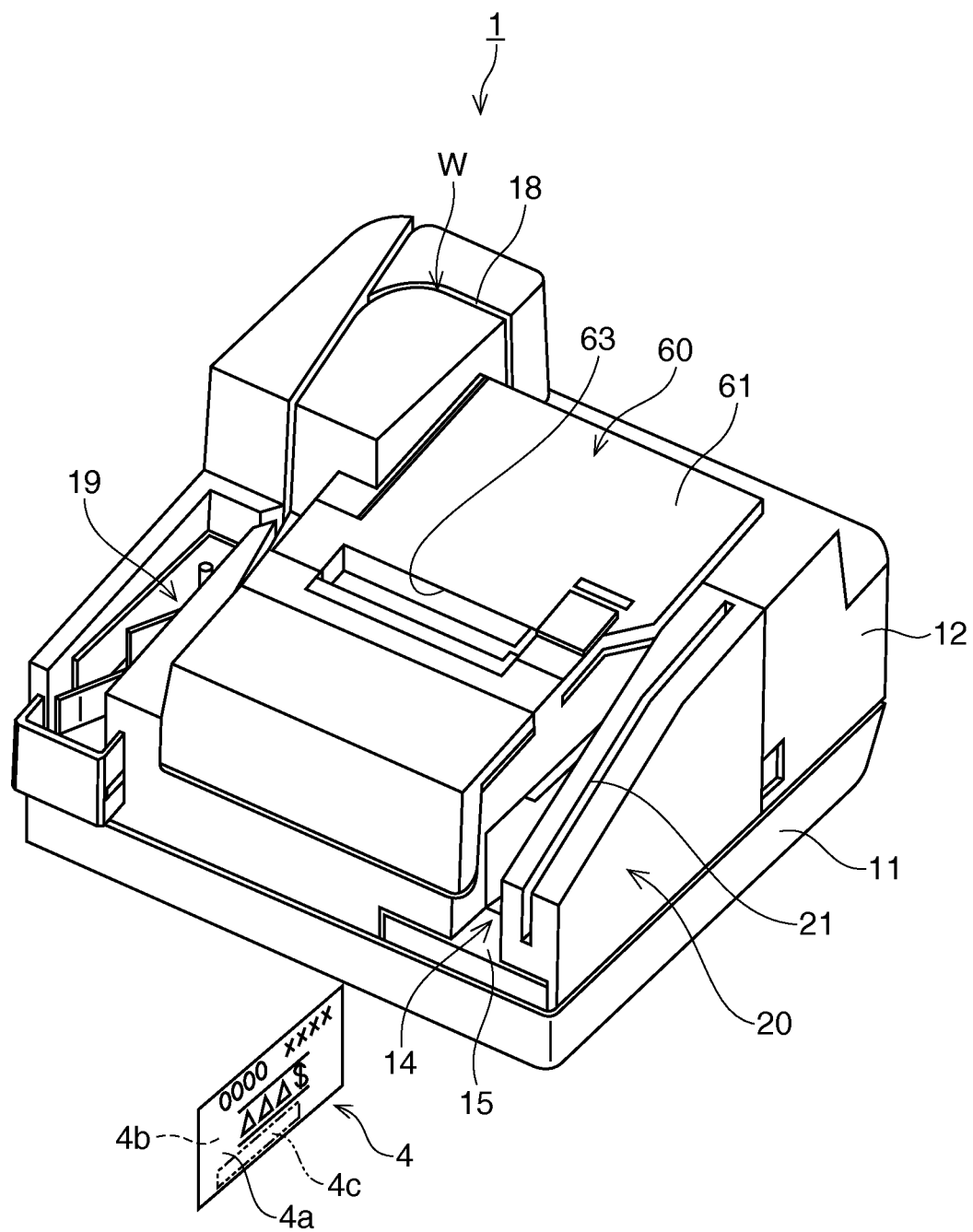
FIG. 1 is an external oblique view of a multifunction device.

A preferred embodiment of the present invention is described below with reference to the accompanying figures.
Configuration of a Multifunction Device FIG. 1 is an oblique view of a multifunction device 1 according to this embodiment of the invention.

The multifunction device 1 is a device that can process media such as checks 4 (media) and other forms in multiple ways, including reading magnetic ink characters printed on the processed medium, optically imaging (scanning) both sides of the processed medium, and recording (printing) images on the processed medium. The multifunction device 1 also functions as a card reader that reads magnetic information recorded on card media such as credit cards, and functions to produce specific types of tickets with an image recorded thereon by recording an image to thermal roll paper (recording medium) and cutting the paper.

This embodiment of the invention describes processing checks 4 as an example of the processed medium. As shown in FIG. 1, a check 4 is a form having a payment amount, payee, serial number, payer signature, and other information recorded on a sheet with a specific colored or patterned background. The payment amount, payee, serial number, payer signature, and other information are recorded on the face 4a. An MICR line 4c is printed along the length of the check 4 on the face 4a. The MICR line 4c is a line of magnetic ink characters printed with magnetic ink, and can be read magnetically and optically.

An endorsement area is provided on the back 4b of the check 4. An endorsement image is recorded in the endorsement area by an inkjet head 10 described below.

The lengths of the short and long sides of a check 4 are standardized, but can be of various different sizes because there are different standards. The multifunction device 1 defines a maximum check size that includes substantially all commonly used sizes of checks 4, and can process any check 4 within this maximum size.

The outside case of the multifunction device 1 includes a bottom case 11 that covers the bottom part of the multifunction device 1, and a cover 12 that covers the bottom case 11, and the main unit 13 (FIG. 2) of the multifunction device 1 is housed inside this outside case. An entrance 14 for inserting checks 4 is open at the front of the multifunction device 1, and a stacker 15 that can hold a stack of plural checks 4 is provided inside the entrance 14. The stacker 15 can be pulled out to the front, and the checks 4 can be loaded into the stacker 15 after adjusting the stacker 15 to the size of the checks 4 to be stored in the stacker 15.

A slot 18 that is substantially U-shaped when seen from above and is used as the conveyance path W of the checks 4 is formed in the cover 12. The slot 18 communicates with the stacker 15, and the slot 18 communicates with an exit pocket 19 at the front of the multifunction device 1. Checks 4 stored in the stacker 15 are fed one by one into the multifunction device 1 as described below, are processed as they pass through the slot 18, and the processed checks 4 are discharged into the exit pocket 19. Multiple checks 4 can accumulate in the exit pocket 19.

As shown in FIG. 1, a magnetic card reader 20 is disposed beside the stacker 15. The magnetic card reader 20 includes a card slot 21 formed in the cover 12, and a MCR (magnetic card reader) head 22 (FIG. 3) disposed facing the card slot 21, and reads information magnetically recorded on cards passing through the card slot 21 with the MCR head 22.

Figure 2:
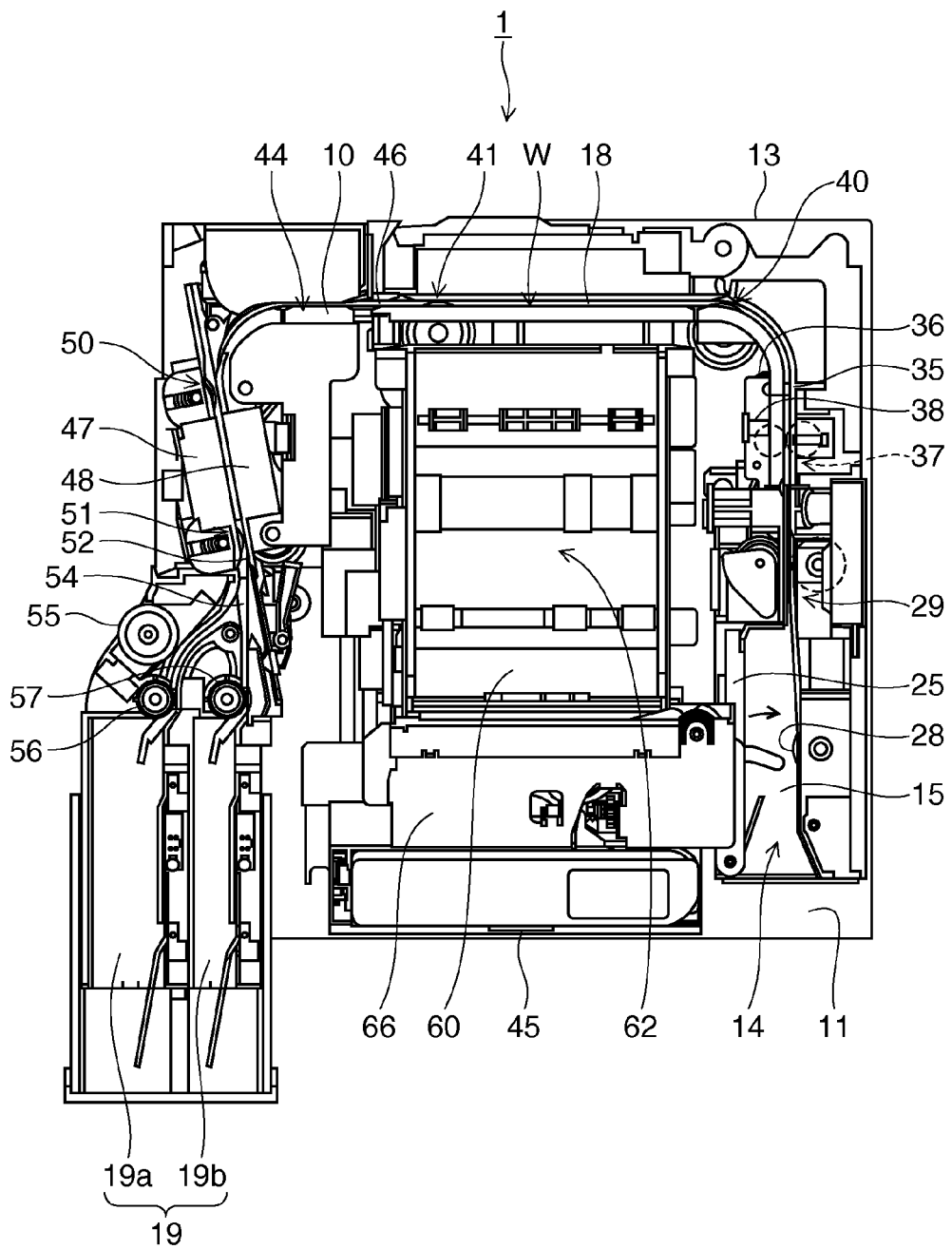
FIG. 2 shows the internal configuration of the multifunction device.

FIG. 2 is a plan view showing the configuration of the main unit 13 of the multifunction device 1 housed the outside case. A hopper 25 is disposed on one side of the stacker 15. The hopper 25 can pivot in the direction of the arrow by means of a hopper drive motor 26 (FIG. 3), and pushes the checks 4 in the stacker 15 to the other side.

A pickup roller 28 driven by an ASF (automatic sheet feeder) motor 27 (FIG. 3) described below is disposed on the other side of the stacker 15, and when the hopper 25 rotates toward the pickup roller 28, one check 4 in the stacker 15 is urged by the rotating hopper 25 to the pickup roller 28, contacts the roller, and is fed into the conveyance path W by rotation of the pickup roller 28.

An ASF roller set 29 composed of a pair of rollers is disposed downstream from the stacker 15. The two rollers of the ASF roller set 29 are disposed on opposite sides of the conveyance path W, one roller is driven by the ASF motor 27, and the other roller is a follower roller. The check 4 in contact with the pickup roller 28 is nipped by the ASF roller set 29, and conveyed downstream through the slot 18.

An ASF paper detector 31 (FIG. 3) is disposed to a specific position in the stacker 15. The ASF paper detector 31 is a transmissive photosensor in this embodiment, and detects if a check 4 is in the stacker 15.

A hopper position detector 32 (FIG. 3) is disposed at the standby position of the hopper 25 in the stacker 15. The hopper position detector 32 is a transmissive photosensor in this embodiment, and detects if the hopper 25 is in the standby position.

A MICR (magnetic ink character recognition) head 35 that contacts the face 4a of the check 4 and magnetically reads the MICR line 4c (FIG. 1) is disposed downstream from the ASF roller set 29. A MICR roller 36 is disposed opposite the MICR head 35. The MICR roller 36 is pushed to the MICR head 35 side, rotates while pressing the check 4 against the MICR head 35, and conveys checks 4 at a constant speed suited to reading the MICR line. An assist roller set 37 composed of a pair of rollers that guide the check 4 fed by the ASF roller set 29 to the MICR head 35 is disposed on the upstream side of the MICR head 35.

A paper length detector 38 is disposed to the conveyance path W between the assist roller set 37 and MICR head 35. The paper length detector 38 is a reflective photosensor in this embodiment, and detects the leading end and trailing end of each check 4 by detecting if a check 4 passing through the conveyance path W is at the detection position. The control unit 70 acquires the output signals of the paper length detector 38 and determines the length of the check 4 based on change in detector output.

A first conveyance roller set 40 including a pair of rollers disposed on opposite sides of the conveyance path W is disposed to the conveyance path W on the downstream side of the MICR head 35, and a second conveyance roller set 41 is disposed downstream from the first conveyance roller set 40. The first conveyance roller set 40 and second conveyance roller set 41 are driven rotationally by a conveyance motor 42 (FIG. 3), and these rollers convey the check 4 to the inkjet printer unit 44.

The inkjet printer unit 44 has an inkjet head 10. The inkjet head 10 is an inkjet recording head that is supplied with ink from an ink cartridge 45 installed in the front part of the main unit 13 and ejects ink onto the check 4. The inkjet head 10 is an inkjet line head. When recording on a check 4, ink is ejected from the stationary inkjet head 10 to the back 4b of the check 4 conveyed at a constant speed, and an image is recorded. The image recorded on the back 4b of the check 4 is an endorsement including text or symbols.

An intermediate detector 46 is disposed on the upstream side of the inkjet head 10 between the inkjet head 10 and second conveyance roller set 41. The intermediate detector 46 is a reflective photosensor in this embodiment, and detects if a check 4 is at the detection position.

A CIS (contact image sensor) unit for optically reading checks 4 is disposed downstream from the inkjet head 10. This CIS unit includes a front CIS unit 47 for imaging the face 4a of the check 4, and a back CIS unit 48 for imaging the back 4b, and can thus optically image both sides of each check 4. The front CIS unit 47 and back CIS unit 48 are disposed on opposite sides of the conveyance path W. A first CIS roller 50 is disposed on the upstream side and a second CIS roller 51 is disposed on the downstream side of these units. The first CIS roller 50 and second CIS roller 51 are rollers that are driven rotationally by the conveyance motor 42, and checks 4 are conveyed by these rollers at a constant speed while being imaged by the CIS units.

A discharge detector 52 is located downstream from the second CIS roller 51. The discharge detector 52 is a reflective photosensor in this embodiment, and detects if a check 4 is at the detection position.

The exit pocket 19 described above is located downstream from the front CIS unit 47 and back CIS unit 48. The exit pocket 19 is divided into a main pocket 19a and a sub-pocket 19b, and the slot 18 splits and is connected to both the main pocket 19a and sub-pocket 19b. The main pocket 19a and sub-pocket 19b can each hold a plurality of checks 4.

A flapper 54 that switches the exit pocket 19 into which the check 4 is discharged to the main pocket 19a or sub-pocket 19b is disposed at the position where the slot 18 splits. The flapper 54 is a guide that by closing the path to the main pocket 19a or the path to the sub-pocket 19b guides the check 4 into the other pocket, and is driven by the flapper drive motor 55.

A discharge roller 56 is disposed to the path from the flapper 54 to the main pocket 19a, another discharge roller 57 is disposed to the path from the flapper 54 to the sub-pocket 19b, and the checks 4 are thus smoothly discharged by these rollers and guided by the flapper 54 into the appropriate exit pocket 19.

As described below, the multifunction device 1 discharges the check 4 into the main pocket 19a when the check 4 is determined to have been correctly loaded based on the result of the MICR head 35 reading the MICR line 4c, and into the sub-pocket 19b when the check 4 is determined to have not been correctly loaded.

As shown in FIG. 1 and FIG. 2, a thermal printer unit 60 (ticket issuing unit) for printing tickets with an image recorded thereon is provided in the middle of the multifunction device 1.

A shown in FIG. 1, the thermal printer unit 60 has a printer cover 61 covering the top of the unit. This printer cover 61 is attached to the cover 12 so that the printer cover 61 can open and close freely. When the printer cover 61 is open, a roll paper compartment 62 (FIG. 2), which is a space for holding thermal roll paper, is exposed and the thermal roll paper can be installed or replaced. A paper exit 63 is formed in the printer cover 61, and the thermal roll paper held in the roll paper compartment 62 can be discharged through the paper exit 63.

The thermal printer unit 60 includes a roller platen (not shown in the figure) that supplies and feeds thermal roll paper from the roll paper compartment 62 through the conveyance path W, a thermal head 65 (FIG. 3) disposed opposite the platen, and a cutter unit 66 that cuts the thermal roll paper perpendicularly to the conveyance direction. To produce a ticket, the thermal printer unit 60 records an image on the thermal roll paper with the thermal head 65 while driving the platen and conveying the thermal roll paper in the conveyance direction, and then cuts the thermal roll paper at a specific position with the cutter unit 66 to produce a ticket.

Figure 3:
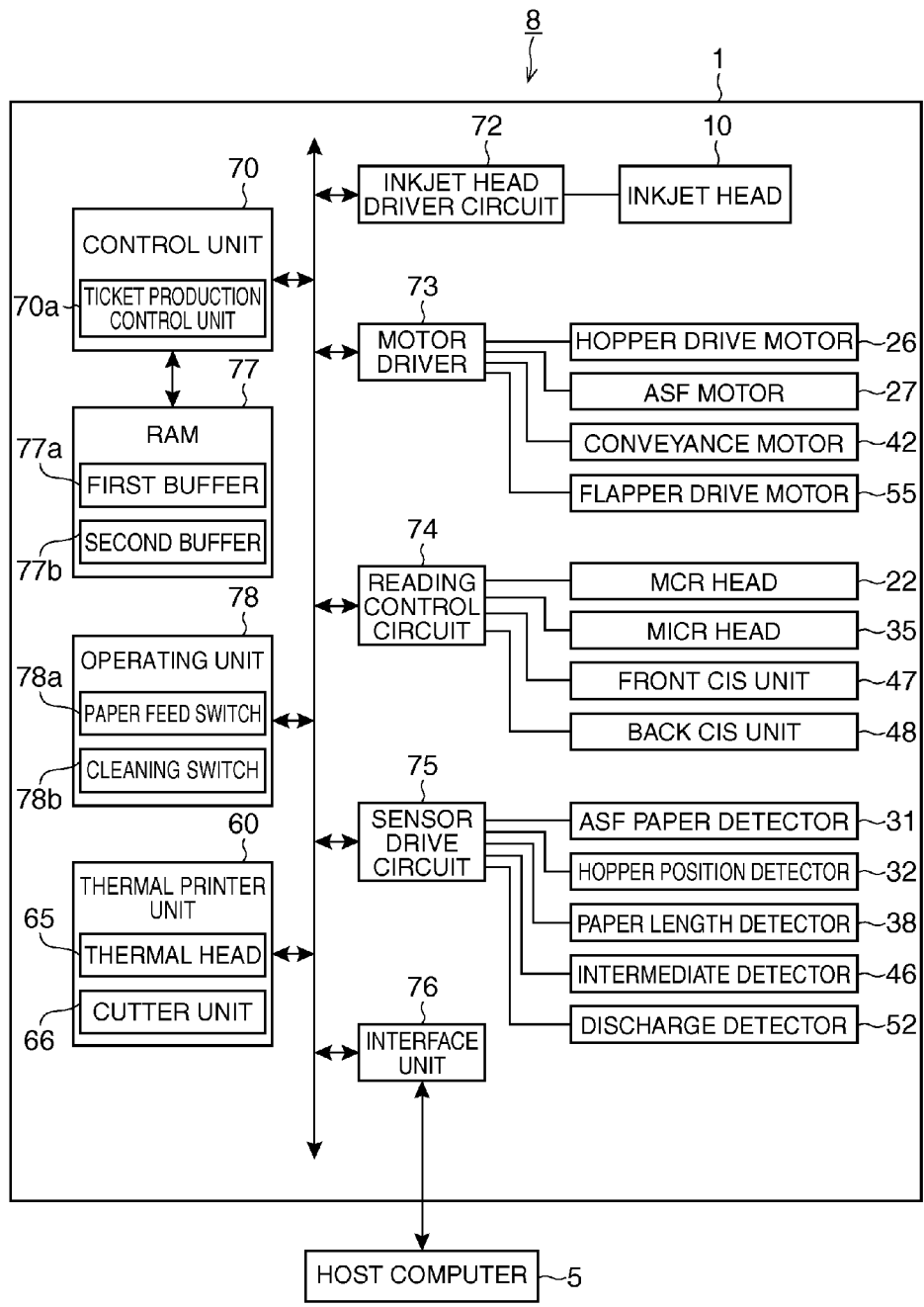
FIG. 3 is a block diagram showing the functional configuration of the multifunction device.

FIG. 3 is a block diagram showing the functional configuration of a multifunction processing system 8 composed of the multifunction device 1 connected to a host computer 5 (control device).

The multifunction device 1 has a control unit 70 that controls multifunction device 1 operation; a inkjet head driver circuit 72, motor driver 73, reading control circuit 74, sensor drive circuit 75, interface unit 76, and operating unit 78, which are connected so that they can communicate with each other.

The control unit 70 centrally controls the other parts of the multifunction device 1, and controls other parts of the multifunction device 1 by means of a CPU reading and running a control program stored in connected flash ROM. The control unit 70 also has a process control unit 70a (ticket production control unit) further described below.

RAM 77 is connected to the control unit 70, and a front buffer (first buffer) 77a and back buffer (second buffer) 77b further described below are formed in RAM 77.

The control unit 70 supplies drive current to the inkjet head 10 through the inkjet head driver circuit 72 to eject ink from the inkjet head 10 and record an image on a check 4.

The motor driver 73 is connected to the hopper drive motor 26 and causes the hopper 25 to pivot as controlled by the control unit 70. The motor driver 73 is also connected to the ASF motor 27 and conveyance motor 42, outputs drive current and drive pulses to the motors, and operates the motors and drives the rollers connected to the motors as controlled by the control unit 70.

In this embodiment, the control unit 70, motor driver 73, hopper drive motor 26, hopper 25, ASF motor 27, and conveyance motor 42, the rollers that rotate with these motors, and other mechanisms work together and function as a conveyance unit that conveys checks 4 (media).

The motor driver 73 is connected to the flapper drive motor 55, and outputs drive current and drive pulses to the motor as controlled by the control unit 70 to move the flapper 54 to change the exit pocket 19 into which the check 4 is discharged to the main pocket 19a side or the sub-pocket 19b side.

The reading control circuit 74 is connected to the MCR head 22, MICR head 35, front CIS unit 47, and back CIS unit 48.

The reading control circuit 74 causes the MCR head 22 to read the magnetic information when a card is swiped through the card slot 21 (FIG. 1), and digitizes and outputs the read signal output from the MCR head 22 to the control unit 70 as controlled by the control unit 70.

The reading control circuit 74 also reads magnetic information with the MICR head 35, and digitizes and outputs the read signal output from the MICR head 35 to the control unit 70 as controlled by the control unit 70.

The control unit 70 outputs data related to the result of reading with the MICR head 35 to the host computer 5.

The control unit 70, reading control circuit 74, MICR head 35, and other mechanisms work together and function as a reading unit.

The reading control circuit 74 also scans the face 4a and back 4b of the check 4 with the front CIS unit 47 and back CIS unit 48 as controlled by the control unit 70, and digitizes and outputs the signals output from the front CIS unit 47 and back CIS unit 48 to the control unit 70.

The control unit 70, reading control circuit 74, front CIS unit 47 and back CIS unit 48, and other mechanisms work together and function as a reading unit.

The sensor drive circuit 75 is connected to the ASF paper detector 31, hopper position detector 32, paper length detector 38, intermediate detector 46, and discharge detector 52, supplies current to these detectors, gets the output values therefrom at specific times, and digitizes and outputs the acquired detection signals to the control unit 70.

The interface unit 76 is connected to the host computer 5 by wire or wirelessly, and exchanges data, including control data, with the host computer 5 as controlled by the control unit 70. The control unit 70 and interface unit 76 work together and function as a reception unit that receives control commands from the host computer 5.

The operating unit 78 is connected to switches disposed to the multifunction device 1, detects operation of the switches, and outputs to the control unit 70. These switches include at least a paper feed switch 78a for manually feeding thermal roll paper stored in the thermal printer unit 60, and a cleaning switch 78b for manually cleaning the inkjet head 10.

A thermal printer unit 60 is also connected to the control unit 70.

As described above, the thermal printer unit 60 includes the thermal head 65 and a cutter unit 66, and produces tickets by the process control unit 70a of the control unit 70 controlling the parts of the thermal printer unit 60 to record an image on the thermal roll paper with the thermal head 65 while conveying the thermal roll paper from the roll paper compartment 62 in the conveyance direction with the platen, and then cutting the thermal roll paper at a specific position with the cutter unit 66.

This function of the process control unit 70a is achieved by the cooperation of hardware and software, such as a CPU reading and running a control program.

The multifunction device 1 according to this embodiment of the invention can continuously process a plurality of checks 4 stored in the stacker 15 by repeatedly running a process that picks and delivers one check into the conveyance path W at a specific time and processes the check with the devices disposed along the conveyance path W. The multifunction device 1 can also read the processed check 4 with the MICR head 35, and produce a ticket on which an image reflecting the result of scanning with the CIS unit is recorded.

After producing a ticket, the multifunction device 1 can also reprint the ticket when a command to reprint the ticket is received.

The operation of the multifunction processing system 8 when processing a single check 4, producing a ticket for the check 4 based on the result of reading the check 4 during processing, and reprinting a ticket when a reprint command is received is described below.

Operation of the Multifunction Device 1

Figure 4:
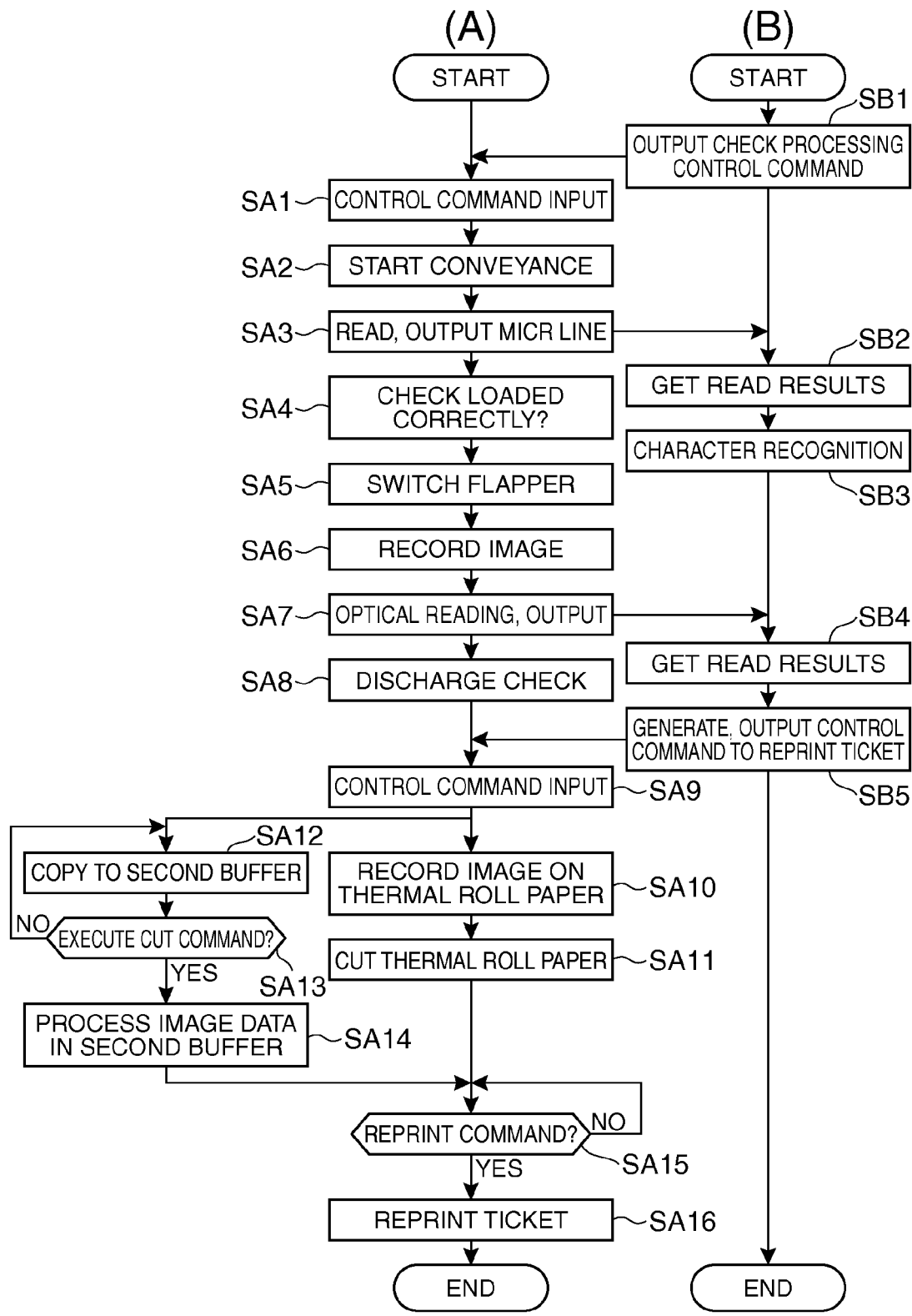
FIG. 4 is a flow chart of the operation of a multifunction processing system.

FIG. 4 is a flow chart showing the operation of the multifunction processing system 8.

In FIG. 4, (A) shows the operation of the multifunction device 1, and (B) shows the operation of the host computer 5.

The host computer 5 first outputs a control command to the multifunction device 1 to process a check 4 (step SB1). The control command output at this time includes all commands required for the multifunction device 1 to apply all of steps SA1 to SA8 to the check 4. The process of generating and outputting control commands is executed by a function of a device driver installed on the host computer 5.

When a control command is received (step SA1), the control unit 70 of the multifunction device 1 drives the hopper drive motor 26 and ASF motor 27 while monitoring the output values of the hopper position detector 32 and ASF paper detector 31, feeds one check 4 from the checks 4 stored in the stacker 15 into the conveyance path W, and starts check 4 conveyance (step SA2).

Next, the control unit 70 reads the MICR line 4c of the check 4 with the MICR head 35 while managing the position of the check 4 by monitoring the output from the paper length detector 38, and outputs data related to the reading result to the host computer 5 (step SA3).

The host computer 5 thus acquires data related to the result of reading with the MICR head 35 (step SB2), and recognizes the magnetic ink characters based on the acquired data (step SB3). For example, the host computer 5 compares the waveforms of the detection signals output by the MICR head 35 with standard waveforms for pattern matching based on the received data, and tries to recognize each of the magnetic ink characters in the MICR line 4c of the check 4. If all magnetic ink characters in the MICR line 4c can be recognized, the host computer 5 determines that character recognition was successful, and determines that recognition failed if even one character cannot be recognized.

After reading with the MICR head 35, the control unit 70 of the multifunction device 1 the control unit 70 determines if the check 4 was loaded correctly instead of backwards top-bottom or front-back based on the result of reading with the MICR head 35 (step SA4). More specifically, the ticket production control unit 70a determines if the check 4 was loaded upside down based on whether or not magnetic waveforms were detected, and determines if the check 4 was inserted with the front and back reversed based on the state of the magnetic waveforms.

Next, the control unit 70 drives the flapper drive motor 55 to switch the flapper 54 based on the result from step SA4 (step SA5). More specifically, if the check 4 was loaded correctly, the control unit 70 switches the flapper 54 to the main pocket 19a side, and if the check 4 was not loaded correctly, the control unit 70 switches the flapper 54 to the sub-pocket 19b side. Note that steps SA4 and SA5 could run parallel to steps SA6 and SA7 described below.

Next, the control unit 70 drives the rollers by driving the conveyance motor 42 to convey the check 4 while monitoring the position of the check 4 by monitoring output from the intermediate detector 46, and records a specific image on the back 4b of the check 4 with the inkjet head 10 (step SA6).

Note that if the check 4 was not loaded correctly, recording an image in step SA6 may be skipped.

The control unit 70 then optically reads the face 4a of the check 4 with the front CIS unit 47 while optically reading the back 4b with the back CIS unit 48, and outputs the results to the host computer 5 (step SA7). Note that if the check 4 was not loaded correctly, scanning in step SA7 may be skipped. The host computer 5 thus acquires data related to the result of reading with the CIS unit (step SB4).

The control unit 70 then drives the rollers by driving the conveyance motor 42 to discharge the check 4 into the exit pocket 19 while monitoring whether or not the check 4 was discharged correctly by monitoring the output of the discharge detector 52 (step SA8). The check 4 is guided at this time by the flapper 54 into the appropriate exit pocket 19, that is, the main pocket 19a or sub-pocket 19b, based on the result of reading by the MICR head 35.

After acquiring data related to the result of reading with the CIS unit in step SB4, the host computer 5 generates and outputs a control command to produce a specific ticket based on the result of character recognition in step SB3 and the result of scanning with the CIS unit obtained in step SB4 (step SB5).

The content of the control command output from the host computer 5 to the multifunction device 1 in step SB5, and the content of a ticket produced based on this control command, are described next with reference to a specific example.

Figure 5:
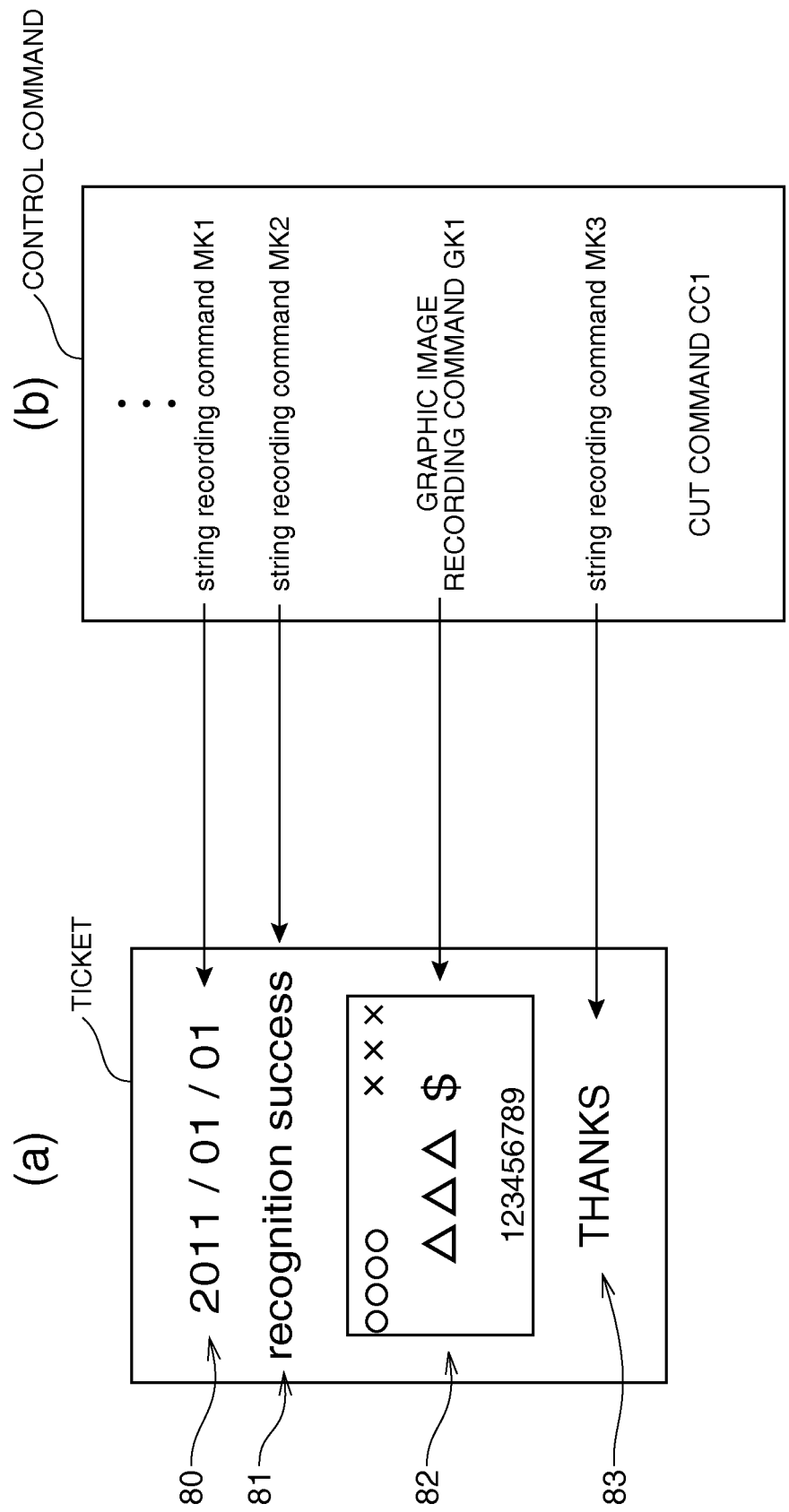
FIG. 5 shows an example of a ticket and a control command for producing a ticket.

FIG. 5 (a) shows an example of a ticket produced based on the control command generated and output in step SB5.

In the example shown in FIG. 5 (a), date information 80 identifying the date the ticket is issued is recorded at the beginning of the ticket. Recognition result information 81 indicating if character recognition was successful in step SB3 is recorded on the ticket below the date information 80. A front check image 82, which is a graphic image of the face 4a of the check 4, is recorded on the ticket below the recognition result information 81. A standard greeting 83, which is a standard string recorded at the end of every ticket, is recorded on the ticket below the front check image 82.

By thus recording recognition result information 81 and a front check image 82 on a ticket, the practical need to produce a ticket containing information and an image based on the result of processing a check 4 so that the ticket can be given to a customer or stored as required is met.

FIG. 5 (b) shows an example of the content of the control command for issuing the ticket shown in FIG. 5 (a).

As shown in FIG. 5 (b), the control command includes a string recording command MK1 for recording the string contained in the date information 80. Included in this string recording command MK1 is a command code for recording a string, and the string contained in the date information 80 (the string "2011/01/01" in this example). As described below, the multifunction device 1 converts the characters in the string to the corresponding font data, writes the characters to the first buffer 77a, and records on thermal roll paper. Font data is the actual data expressing the characters in a form that can be recorded on the thermal roll paper, and could be dot matrix font data, vector font data, outline font data, bitmap font data, or scalar font data, for example.

A string recording command MK2 is contained in the control command after the string recording command MK1. This string recording command MK2 is a command for recording the string constituting the recognition result information 81. The host computer 5 generates the string recording command MK2 to record a string showing that recognition was successful, or a string showing that recognition failed, based on the result of character recognition in step SB3, and includes the command MK2 in the control command.

A graphic image recording command GK1 is also included in the control command after the string recording command MK2.

This graphic image recording command GK1 is a control command for recording the front check image 82, and includes image data for the face 4a of the check 4 (bitmap data or other data storing information related to the color of each pixel, referred to below as the "front image data"). The host computer 5 applies the necessary image process to the data acquired from the front CIS unit 47 in step SB4 to generate the front image data, generates a graphic image recording command GK1 containing the generated front image data and an instruction to record the front check image 82 based on the front image data, and includes the command GK1 in the control command.

A string recording command MK3 is also included in the control command following the graphic image recording command GK1. This string recording command MK3 is a command for recording the string constituting the standard greeting 83.

A cut command CC1 follows the string recording command MK3 in the control command.

This cut command CC1 is a command for cutting the thermal roll paper. The ticket is cut from the thermal roll paper and producing a ticket is completed by cutting the thermal roll paper based on this command. The cut command CC1 is thus the last command in the group of commands contained in a control command for producing one ticket.

In the operation described below, the host computer 5 outputs the control command shown in FIG. 5 (*b*) to print a ticket as shown in FIG. 5 (*a*) to the multifunction device 1 in step SB5.

Referring again to FIG. 4, when the control command output from the host computer 5 in step SB5 is input (step SA9), the ticket production control unit 70a of the control unit 70 of the multifunction device 1 sequentially records images on the thermal roll paper based on the string recording commands MK1, MK2, the graphic image recording command GK1, and the string recording command MK3 contained in the control command (step SA10).

The operation performed in step SA10 is described next.

Figure 6:
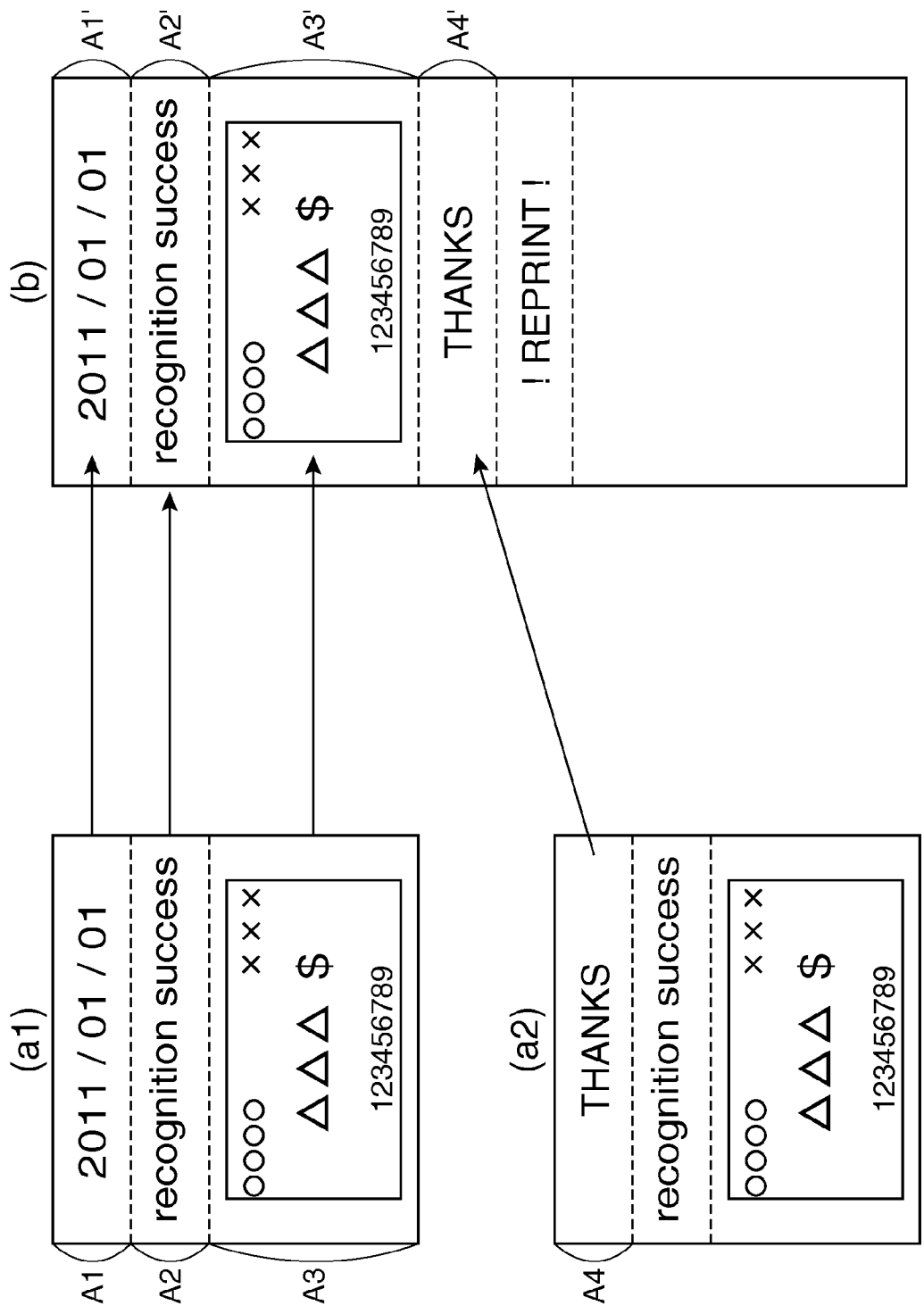
FIG. 6 schematically describes a first buffer and a second buffer.

FIGS. 6 (*a*1) and (*a*2) schematically show the structure of the first buffer 77a to describe the process executed in step SA10.

For convenience of description below, image data is not written to the first buffer 77a when the operation starts.

The first buffer 77a is a ring buffer to which image data for the images to be recorded on the thermal roll paper is written. Using a ring buffer for the first buffer 77a reduces the risk of buffer overflows, and enables using memory efficiently in the recording method of this embodiment of the invention whereby writing image data to the buffer and recording images based on the buffered image data proceed sequentially.

In step SA10, the ticket production control unit 70a converts the string of the date information 80 to font data based on the string recording command MK1, and writes the resulting font data as image data to area A1 (FIG. 6 (*a*)). This area A1 is a storage area for one line of text recorded on the thermal roll paper.

The ticket production control unit 70a then controls the drive circuit of the thermal head 65 based on the image data buffered to area A1, and records the date information 80 to the thermal roll paper with the thermal head 65.

Next, the ticket production control unit 70a writes font data for the string in the recognition result information 81 as image data to area A2 (FIG. 6 (*a*1)) based on the string recording command MK2, and based on the buffered image data records the recognition result information 81 to the thermal roll paper with the thermal head 65.

Next, the ticket production control unit 70a writes the front image data to area A3 (FIG. 6 (*a*1)) based on the graphic image recording command GK1, and based on the buffered front image data records the front check image 82 to the thermal roll paper with the thermal head 65.

Due to the amount of memory allocated to the first buffer 77a, the first buffer 77a moves the start address for writing the next image data to the first address in the first buffer 77a after writing the front image data to area A3.

Next, the ticket production control unit 70a writes font data for the string in the standard greeting 83 as image data to area A4 (FIG. 6 (*a*2)) based on the string recording command MK3, and based on the buffered image data records the standard greeting 83 to the thermal roll paper with the thermal head 65.

Writing image data based on the command to the first buffer 77a, and recording images based on the buffered image data, thus proceed sequentially command by command in step SA10.

Referring again to FIG. 4, after recording images in step SA10, the ticket production control unit 70a cuts the thermal roll paper based on the cut command CC1 contained in the control command (step SA11). This completes producing a ticket containing the date information 80, recognition result information 81, front check image 82, and standard greeting 83.

Parallel to step SA10, the ticket production control unit 70a copies the image data stored in the first buffer 77a to the second buffer 77b (step SA12).

Step SA12 is described next.

FIG. 6 (*b*) shows the structure of the second buffer 77b to describe the operation in step SA12.

The second buffer 77b is large enough to store the greatest amount of image data expected to be recorded on one ticket.

Each time image data is written to a specific address in the first buffer 77a based on the received commands, the ticket production control unit 70a copies the buffered data sequentially to the second buffer 77b in step SA12.

More specifically, when the image data for the date information 80 is written to area A1 in the first buffer 77a, the ticket production control unit 70a copies the same image data to area A1' in the second buffer 77b (FIG. 6 (*b*)). This area A1' is a storage area of the same size as area A1, and is created at the beginning of the second buffer 77b.

When the image data for the recognition result information 81 is written to area A2 in the first buffer 77a, the ticket production control unit 70a copies the same image data to area A2' in the second buffer 77b (FIG. 6 (*b*)). This area A2' is a storage area of the same size as area A2, and is formed contiguously to area A1'.

When the image data for the front check image 82 is written to area A3 in the first buffer 77a, the ticket production control unit 70a copies the same image data to area A3' in the second buffer 77b (FIG. 6 (*b*)). This area A3' is a storage area of the same size as area A3, and is formed contiguously to area A2'.

When the image data for the standard greeting 83 is written to area A4 in the first buffer 77a, the ticket production control unit 70a copies the same image data to area A4' in the second buffer 77b (FIG. 6 (*b*)). This area A4' is a storage area of the same size as area A4, and is formed contiguously to area A3'.

The ticket production control unit 70a thus copies the same image data to the second buffer 77b in step SA12 every time image data is written to the first buffer 77a. When copying the next image data after copying the image data for one image, the ticket production control unit 70a copies the image data to the next area contiguous to the area to which the first image data was copied.

While copying image data in step SA12, the ticket production control unit 70a monitors if the thermal roll paper was cut based on a cut command CC1 (step SA13).

If the thermal roll paper was cut based on a cut command CC1 (step SA13 returns Yes), the ticket production control unit 70a stops copying image data to the second buffer 77b and advances to step SA14.

More specifically, until the thermal roll paper is cut based on the cut command CC1 after starting to receive the control command for printing a ticket from the host computer 5, the ticket production control unit 70a copies the image data written sequentially to the first buffer 77a to the second buffer 77b so that the image data is stored in the second buffer 77b as a group of contiguous image data. As a result, knowing that the cut command CC1 is the last command executed in the sequence of control commands for producing one ticket, the image data written to the first buffer 77a as the image data for the images recorded on one ticket can be copied completely and continuously to the second buffer 77b.

In step SA14, the ticket production control unit 70a writes image data for a string (the string "reprint" in the example in FIG. 6) indicating that the ticket is a reprint to the area following area A4' in the second buffer 77b. More specifically, the ticket production control unit 70a processes the images represented by the image data stored in the second buffer 77b on the premise that the data will be recorded on a reprinted ticket.

When a command to reprint a ticket is received, the ticket is printed based on the image data stored in the second buffer 77b as described below. Text indicating that the ticket is a reprint is thus recorded on the reprinted ticket, and reprinted tickets can be recognized as being reprints.

When cutting the thermal roll paper based on the cut command CC1 is completed (step SA11) and processing the image data stored in the second buffer 77b is completed (step SA14), the ticket production control unit 70a monitors if a command to reprint the printed ticket is received (step SA15). This embodiment is configured to assert a reprint command when the paper feed switch 78a and cleaning switch 78b are operated simultaneously, and the ticket production control unit 70a looks for a command to reprint a ticket by detecting if these switches are operated simultaneously.

By enabling asserting a reprint command by operating existing switches in a specific way, the production cost can be reduced compared with proving a dedicated switch for issuing reprint commands.

When a reprint command is detected (step SA15 returns Yes), the ticket production control unit 70a reprints the ticket (step SA16).

More specifically, the ticket production control unit 70a controls the thermal head 65 and records the image on the thermal roll paper based on the image data stored in the second buffer 77b, and when recording all images based on the image data is completed, controls the cutter unit 66 to cut the thermal roll paper, thereby producing a ticket with the same content as the previously printed ticket. By processing the image data as described in step SA14, a string indicating that the ticket is a reprint is also recorded on the reprinted ticket.

As described above, instead of cooperating with the host computer 5 and the host computer 5 again outputting control commands for printing a ticket to the multifunction device 1 when a command to reprint a ticket is asserted, this embodiment of the invention buffers image data for the images to be recorded on the ticket to the second buffer 77b, and reprints a ticket by recording images based on the image data stored in the second buffer 77b. There is therefore no need to communicate with the host computer 5 when reprinting a ticket, and a ticket can be reprinted immediately regardless of the state of communications with the host computer 5.

More particularly, when the need to reprint a ticket arises after a check 4 is processed and communication between the host computer 5 and multifunction device 1 is terminated, both software and hardware communication between the host computer 5 and multifunction device 1 must be reopened, the host computer 5 must resend the control commands for printing a receipt to the multifunction device 1, and reprinting a ticket can take a long time using conventional methods. The invention prevents this from happening.

In addition, if tickets are reprinted based on image data stored in the first buffer 77a, there is a risk of losing image data as a result of overwriting image data in the first buffer 77a because a ring buffer is used as the first buffer 77a to reduce the risk of buffer overflow and to improve storage efficiency. However, by copying the image data to the second buffer 77b when image data is written to the first buffer 77a, and recording the images to reprint a ticket based on the image data copied to the second buffer 77b when reprinting a ticket, this embodiment of the invention can reliably prevent loss of image data and can reliably reprint a ticket with the same content as the originally issued ticket.

When the check processing sequence starts for the next check 4 after printing a ticket for one check 4, and writing the image data for the images related to the next check 4 to the first buffer 77a starts in this embodiment, the second buffer 77b is cleared and the image data is copied starting at the first address in the buffer. This embodiment can therefore reprint the last ticket printed and cannot reprint tickets further back in history, but this poses no practical problem because the reprint function is designed for quickly reprinting the last ticket when requested by the customer or for some other reason. Providing plural reprint buffers so that one or more tickets printed before the last ticket can be printed is obviously also possible.

As described above, the ticket production control unit 70a in this embodiment of the invention copies the image data written to the first buffer 77a to the second buffer 77b when image data is written to the first buffer 77a, and when a reprint ticket command is asserted, records images to thermal roll paper based on the image data copied to the second buffer 77b, and cuts the thermal roll paper to reproduce the ticket.

As a result, there is no need to get a control command to reprint a ticket from the host computer 5 in order to reprint a ticket, and tickets can be quickly reprinted without being affected by the state of communication with the host computer 5.

In this embodiment the ticket production control unit 70a continuously copies image data written to the first buffer 77a as image data for recording one ticket to the second buffer 77b until the thermal roll paper is cut based on the cut command CC1 after starting to receive a control command for printing one ticket. When a command to reprint the ticket is received, the ticket production control unit 70a records on the thermal roll paper based on the image data copied to the second buffer 77b as the image data for images to be recorded on the one ticket.

As a result, knowing that the cut command CC1 is the last command executed in the sequence of control commands for producing one ticket, image data can be copied to the second buffer 77b ticket by ticket, and the images to be recorded when reprinting a ticket can be recorded completely without losing data.

The ticket production control unit 70a in this embodiment of the invention additionally processes image data copied to the second buffer 77b for recording on a reprinted ticket. More specifically, after copying all image data for the images on one ticket to the second buffer 77b, a string identifying the reprinted ticket as a reprint is converted to image data that is buffered continuously to the other image data.

As a result, images can be recorded on reprinted tickets so that the ticket can be recognized as being a reprint.

A command for reprinting a ticket can be asserted by simultaneously operating an existing paper feed switch 78a and cleaning switch 78b in the multifunction device 1 according to this embodiment of the invention.

As a result, by enabling asserting a reprint command by operating existing switches in a specific way, the production cost can be reduced compared with proving a dedicated switch for issuing reprint commands.

The embodiment described above is one example of a preferred embodiment of the invention, and can obviously be changed and adapted in many ways without departing from the scope of the accompanying claims.

For example, a specific example of a printed ticket is described above with reference to FIG. 5 (a), but the content of the ticket is not so limited. For example, an image of the back 4b of the check 4 could also be recorded, or an image based on the result of reading with the magnetic card reader 20 could be recorded.

A string ("reprint" in the example shown in FIG. 6) identifying a reprinted ticket is recorded on reprinted tickets in the embodiment described above, but the invention is not so limited. A specific watermark could be recorded, for example. In this case, the ticket production control unit 70a can appropriately process the image data stored in the second buffer 77b according to the watermark to be recorded.

A reprint command can be asserted by simultaneously operating the paper feed switch 78a and cleaning switch 78b in the foregoing embodiment, but the operation triggering reprinting is not so limited. For example, operating any switch when the cover 12 is open could be the trigger. More specifically, the production cost can be reduced by using an existing switch.

For example, the multifunction device 1 in the foregoing embodiment has the MICR head 35, inkjet head 10, and CIS unit disposed in sequence along the conveyance path W, but the order of these devices and the specific configuration of the multifunction device 1 is not so limited. More specifically, the invention can be widely applied to media processing devices having a conveyance unit that conveys media, a reading unit that reads information from the media conveyed by the conveyance unit, and a ticket printing unit that prints tickets.

The function blocks shown in FIG. 3 can also be rendered through the cooperation of software and hardware, and do not suggest a specific hardware configuration.

The function of the control unit 70, for example, can also be provided by a separate device externally connected to the multifunction device 1.

The steps in the flow chart shown in FIG. 4 can also be executed by running a program stored to an externally connected storage medium.

The processes of the multifunction device 1 described in the foregoing embodiment can also be provided as a program. This program can be run by the control unit 70 that controls parts of the multifunction device 1. The program can also be supplied stored on a storage medium such as a hard disk drive, optical disk, magneto-optical disk, or flash memory.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A multifunction device that can connect to a control device and comprises:
   a conveyance unit that conveys a medium;
   a reading unit that reads the medium conveyed by the conveyance unit and outputs a read result to the control device;
   a ticket producing unit that produces a ticket by recording an image on the recording medium and cutting the recording medium;
   a reception unit that receives from the control device a control command for producing a ticket on which an image reflecting the read result from the reading unit is recorded; and
   a ticket production control unit that produces a ticket based on the control command received by the reception unit by writing image data to a first buffer, recording an image on the recording medium with the ticket producing unit based on the buffered image data, and cutting the recording medium;
   wherein the ticket production control unit copies the image data written to the first buffer to a second buffer when the image data is written to the first buffer, and
      when a command to reprint the ticket is received, the ticket producing unit reprints the ticket by recording an image on the recording medium with the ticket producing unit based on the image data copied to the second buffer, and cutting the recording medium,
   wherein, the ticket production control unit copies the image data to the second buffer parallel to the ticket producing unit producing a ticket.

2. The multifunction device described in claim 1, wherein:
   a cut command for cutting the recording medium is included in the control command; and
   after the reception unit starts receiving a control command from the control device, the ticket production control unit copies image data written to the first buffer to the second buffer as the image data to be recorded on one ticket until the recording medium is cut based on the cut command, and
      when a command to reprint the ticket is received, records on the recording medium with the ticket producing unit based on the image data copied to the second buffer as the image data of the image to be recorded on the one ticket.

3. The multifunction device described in claim 1, wherein:
   the ticket production control unit specifically processes the image data copied to the second buffer for recording on a reprinted ticket.

4. The multifunction device described in claim 1, further comprising:
   one or a plurality of switches for inputting a command;
   wherein reprinting the ticket can be commanded by operating the switch in a specific way.

5. A method of controlling a multifunction device that can connect to a control device and has a conveyance unit that conveys a medium, a reading unit that reads the medium conveyed by the conveyance unit and outputs the read result to the control device, and a ticket producing unit that produces a ticket by recording an image on the recording medium and cutting the recording medium, the control method comprising steps of:

receiving from the control device a control command for producing a ticket on which an image reflecting the read result from the reading unit is recorded;

producing a ticket based on the control command received by a reception unit by writing image data to a first buffer, recording an image on the recording medium with the ticket producing unit based on the buffered image data, and cutting the recording medium;

copying the image data written to the first buffer to a second buffer when the image data is written to the first buffer and parallel to the producing step; and when a command to reprint the ticket is received, reprinting the ticket by recording an image on the recording medium with the ticket producing unit based on the image data copied to the second buffer, and cutting the recording medium.

6. The method of controlling a multifunction device described in claim 5, wherein:

a cut command for cutting the recording medium is included in the control command;

the control method further comprising steps of:

after starting to receive a control command from the control device, copying image data written to the first buffer to the second buffer as the image data to be recorded on one ticket until the recording medium is cut based on the cut command; and when a command to reprint the ticket is received, recording on the recording medium based on the image data copied to the second buffer as the image data of the image to be recorded on the one ticket.

7. The method of controlling a multifunction device described in claim 5, further comprising a step of:

specifically processing the image data copied to the second buffer for recording on a reprinted ticket.

8. A non-transitory computer-readable medium in which a computer program controls parts of a multifunction device that can connect to a control device and has a conveyance unit that conveys a medium, a reading unit that reads the medium conveyed by the conveyance unit and outputs the read result to the control device, and a ticket producing unit that produces a ticket by recording an image on the recording medium and cutting the recording medium, the computer program causing the computer to execute steps of:

producing a ticket based on a control command received from the control device for producing a ticket on which an image reflecting the read result from the reading unit is recorded by writing image data to a first buffer, recording an image on the recording medium with the ticket producing unit based on the buffered image data, and cutting the recording medium;

copying the image data written to the first buffer to a second buffer when the image data is written to the first buffer while producing a ticket; and when a command to reprint the ticket is received, reprinting the ticket by recording an image on the recording medium with the ticket producing unit based on the image data copied to the second buffer, and cutting the recording medium.

* * * * *